March 14, 1939.　　　H. S. EBERHARD　　　2,150,433
TRACTOR
Filed Nov. 8, 1937　　　2 Sheets-Sheet 1
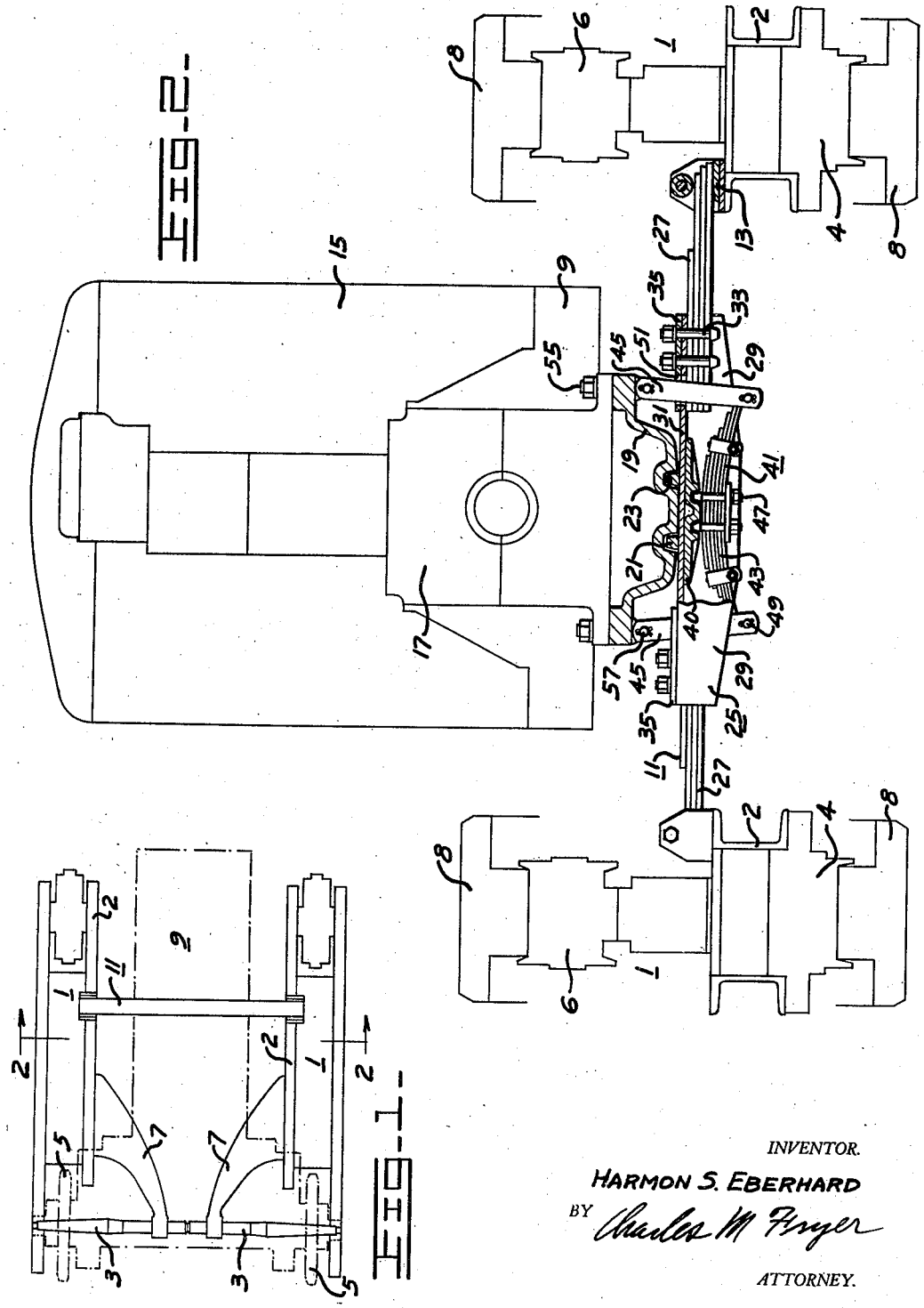
INVENTOR.
HARMON S. EBERHARD
BY
ATTORNEY.

March 14, 1939.  H. S. EBERHARD  2,150,433
TRACTOR
Filed Nov. 8, 1937  2 Sheets-Sheet 2
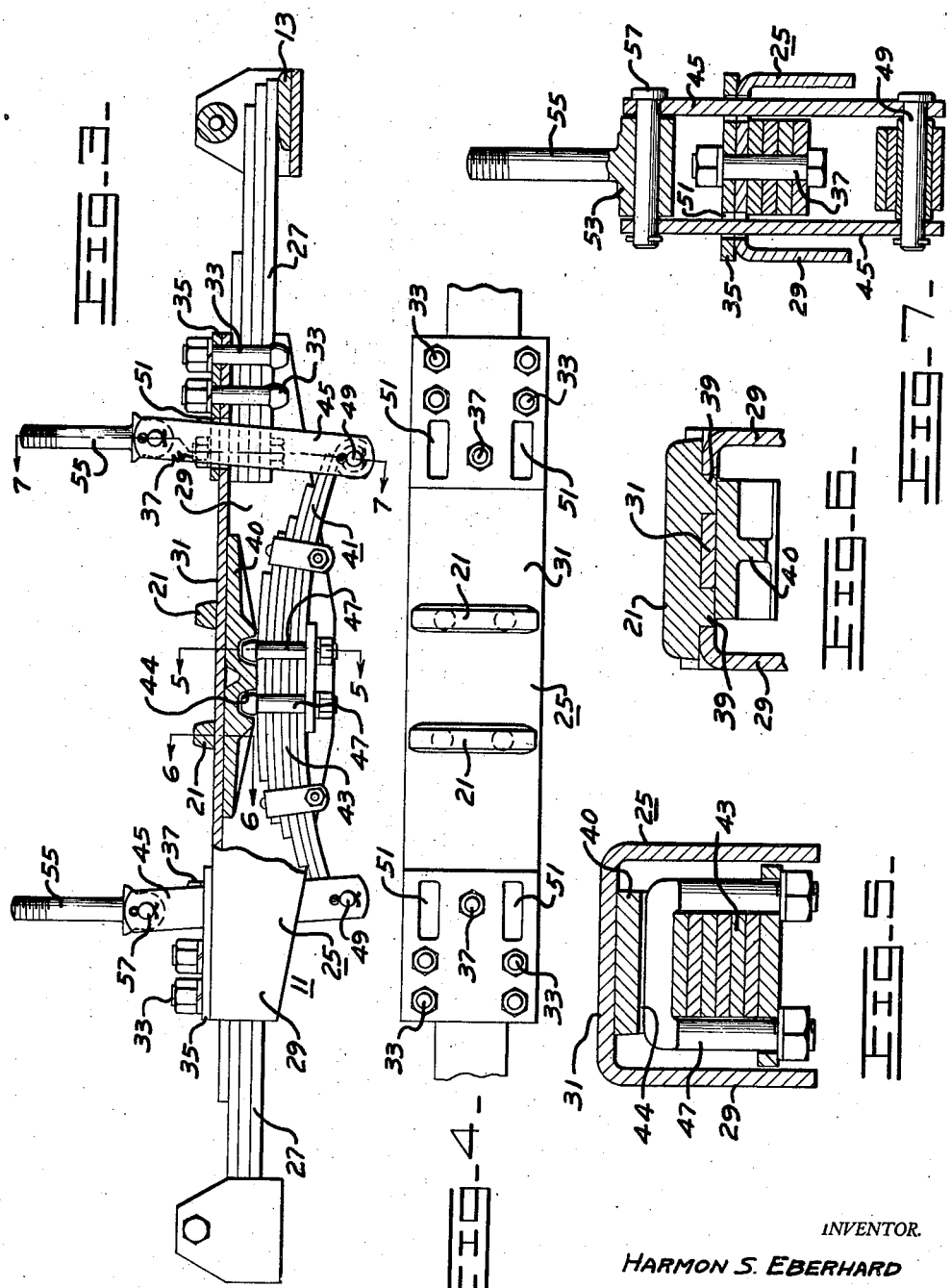
INVENTOR.
HARMON S. EBERHARD
BY Charles M. Fryer
ATTORNEY.

Patented Mar. 14, 1939

2,150,433

UNITED STATES PATENT OFFICE 2,150,433

TRACTOR

Harmon S. Eberhard, Peoria, Ill., assignor to Caterpillar Tractor Co., San Leandro, Calif., a corporation of California Application November 8, 1937, Serial No. 173,384

4 Claims. (Cl. 280—124)

My invention relates to tractors, and more particularly to a track-type or similar type of vehicle in which equalizer apparatus is employed for supporting a tractor body with respect to the track mechanism or similar ground engaging means. The equalizer apparatus of the present invention is of the type illustrated in the patent to Best, No. 1,715,055, of May 28, 1929, which apparatus includes a main equalizer mechanism and an auxiliary equalizer mechanism.

In a track-type or similar tractor, an equalizer mechanism, in general, has a function of permitting relative oscillatory movement of the track or other ground engaging mechanisms with respect to each other, and yet maintain substantially equal weight distribution upon such ground engaging mechanisms and substantially even keel of the tractor body during normal relative oscillation between the track mechanisms while the tractor is moving, as well as when the tractor is at rest. Such mechanism may take the form of a member spanning the track mechanisms and resting upon the track frames. To the midpoint of this spanning member, the tractor body, in constructions which do not employ the teachings of the above mentioned Best patent, is usually pivotally connected by a fixed pivot member. While the equalizer might constitute a rigid bar, for practical purposes in tractor construction, a resilient member such as a spring, is found to be more suitable for the purpose, as its resiliency serves to cushion the body against shocks transmitted through the track mechanism to the equalizer mechanism.

The construction disclosed in the patent to Best above referred to embodies a main equalizer mechanism for a track-type tractor which permits of pivotally supporting the tractor body in surface contact engagement with the main equalizer mechanism and in such a manner as to allow the tractor body to roll or pivot upon the equalizer mechanism in freely abutting engagement therewith.

Side slipping of the tractor body with respect to the main equalizer mechanism is precluded by the presence of a pair of ridge elements extending across the upper surface of this equalizer mechanism and meshing with cooperating grooves in the body of the tractor.

The tractor body is held in close engagement with the main equalizer mechanism and precluded from jumping the groove engaging ridges by means of an auxiliary equalizer mechanism including a leaf spring supported at its mid-point against the under surface of the main equalizer mechanism and connected at its ends by means of tension members or links with the respective sides of the tractor body. This auxiliary spring is preferably loaded when assembled on the tractor, so as to place the connecting links under tension, whereby the body of the tractor will be continually urged under positive action of the auxiliary spring against the main equalizer mechanism, to be maintained in close contact therewith.

The above construction provides a pivotal engagement between the body and the main equalizer mechanism which requires no lubrication, and which is not subject to appreciable wear as the pivot point is not fixed as in a pin connection but is free to shift slightly. The construction is also one which permits ready dislocation of the body from the main equalizer mechanism in the event of accident, i. e., should the tractor roll down a steep hillside; thereby materially reducing the possibility of damage to the tractor. With the pivotal pin connection of the body to the main equalizer mechanism, irreparable damage may accrue under similar circumstances if the pivot connection held, because then in all likelihood a portion of the crankcase would be torn out from the tractor body.

The auxiliary spring, however, has an added function of importance to perform in a tractor. It automatically operates in response to a relative rolling or pivoting movement of the tractor body with respect to the main equalizer mechanism to oppose said movement to the extent of tending to maintain the original normal relationship between the tractor body and the main equalizer mechanism, and thus tends to promote stability and smooth operation.

The construction of the main equalizer mechanism of the Best patent, while designed primarily for tractors of standard gauge (customary spacing between tracks) is also applicable to wide gauge tractors, that is tractors in which the track mechanism is spaced further apart than customary for special conditions. It would be apparent, however, that were such construction applied to a tractor of wide gauge, a considerably heavier main equalizer spring would be required to obtain the same rate of deflection as in the normal gauge tractor. This is explainable by the fact that the longer one makes a spring, the more resilient and flexible it becomes. Therefore, in order to obtain the same rate of deflection as in the smaller spring, the spring must be made considerably heavier. When the spring is of the leaf spring type, either the individual leaves must be made heavier or more leaves must be added to obtain the desired properties, but whichever method is resorted to, the spring will be of increased size and this would materially run up the cost of such an item.

It is accordingly an object of my invention to provide an improved equalizer mechanism which will permit economical application of the equalizer feature to tractors of the wide gauge type.

It is a further object of my invention to provide an improved main equalizer mechanism which shall provide space within for locating an auxiliary equalizer spring.

It is a further object of my invention to provide an equalizer mechanism which shall be simple in design but rugged in construction.

In addition to the above objects, my invention contemplates providing an improved equalizer apparatus including an auxiliary equalizer mechanism which shall provide increased clearance to ground, over what could be realized with the construction of the character disclosed in the Best patent referred to above.

A further contemplated object of my invention provides for an improved equalizer apparatus wherein the main equalizer mechanism and the auxiliary equalizer mechanism are designed to cooperate in increasing the clearance to ground.

Additional objects of my invention will be pointed out in the following description of the same taken in conjunction with the accompanying drawings wherein:

Fig. 1 is a schematic showing of a tractor of the track type embodying equalizer apparatus for supporting the front end of the tractor body or main frame upon the track mechanisms.

Fig. 2 is a view illustrating my improved equalizer apparatus as embodied in a tractor of the track type, a portion of the apparatus being broken away to facilitate an understanding of its cooperation with the tractor main frame or body.

Fig. 3 is a vertical view of my improved equalizer apparatus, with a portion broken away to illustrate the construction of and cooperation between the auxiliary equalizer mechanism and the main equalizer mechanism.

Fig. 4 is a plan view of the mid-section of the main equalizer mechanism of Fig. 3.

Fig. 5 is a sectional view along the line 5—5 of Fig. 3.

Fig. 6 is a sectional view along the line 6—6 of Fig. 3.

Fig. 7 is a sectional view taken in the planes 7—7 of Fig. 3.

In general my invention contemplates fulfilling those objects of my invention relating to the improved main equalizer mechanism per se, by substituting for the leaf spring that constitutes the main equalizer mechanism of the Best patent a composite construction comprising a rigid inflexible mid-section of predetermined length, and affixing to this rigid mid-section, a resilient member at each end, extending outwardly therefrom in a substantially horizontal plane sufficiently to enable the construction to span the track frames and rest thereon. These resilient members are preferably leaf springs of the cantilever type and anchored to the rigid inflexible mid-section. Since the entire resiliency of the composite equalizer mechanism is localized in these cantilever springs, it is apparent that the proper stiffness may be very readily obtained by a proper determination of the length of the rigid mid-section portion. The longer the mid-section, the shorter will be the spring portions and consequently the stiffer will become the equalizer mechanism.

The rigid mid-portion may take on any shape. For example it may comprise a solid bar, but for the purpose of realizing all the advantages of my invention, I prefer to employ a section of channel or a saddle of somewhat similar shape because such construction not only possesses extreme rigidity but a channel section or a saddle provides space or recess between its vertical side walls and resilient end members within which may be mounted auxiliary equalizer mechanism, and it is by reason of this cooperation between the main equalizer mechanism and the auxiliary mechanism that I make it possible to effect an increase in clearance to the ground and thereby fulfill those objects of my invention pertaining to obtaining increased clearance beneath a tractor which incorporates an auxiliary equalizer mechanism.

A more detailed description of my invention follows in connection with the accompanying drawings. In Fig. 1, I have illustrated schematically, in plan view, a tractor of the track type to bring out the cooperative relationship of the equalizer mechanism to the various portions of the tractor. In the tractor illustrated, a pair of spaced track mechanisms 1 including track frames 2 are pivotally secured at the rear of the tractor to oscillate about the axes of the rear axles 3; final drive sprockets 5 being provided for propelling the tractor. The pivotal connection of the track frames 2 permits vertical oscillatory movement of the track mechanisms independently of each other to permit the tractor to accommodate itself to rough ground and obstacles over which it may be traveling. The track mechanisms are maintained in parallel relationship to each other and prevented from spreading by means of rugged braces 7 connecting each of the track frames for pivotal connection to the body 9 of the tractor, shown in outline in Fig. 1, which body is supported at the rear on the rear axles 3 and at its front portion on equalizer apparatus 11 which spans the track frames, and rests thereon to permit of a certain amount of sliding movement occasioned by the oscillatory motion of the track mechanisms in traveling over uneven surfaces.

No attempt has been made to depict details of the present invention in connection with equalizer apparatus in the schematic diagram of Fig. 1, but this has been done in connection with the disclosure of the improved construction as applied to a tractor, in the enlarged showing of Fig. 2. The view is one taken through a tractor along the lines such as 2—2 of Fig. 1 and looking towards the front end of the machine. The portions of the tractor with which the improved equalizer apparatus is directly associated are shown schematically and comprise the pair of spaced track mechanisms 1 including the track frames 2, weight supporting rollers 4, track carrying rollers 6, and the tracks 8. The equalizer apparatus 11 is of sufficient length to span the track frames 2 and rest thereon, a suitable pad 13 being provided upon each track frame to permit of the desirable sliding movement of the ends of the equalizer mechanism in accommodating vertical movements of the track mechanisms. The front end of the tractor which comprises a portion of the body 9 which includes the radiator 15 and engine 17 together with the necessary auxiliary apparatus essential for successful operation of the engine, is supported upon the center portion of the equalizer apparatus 11. In the specific disclosure of Fig. 2 that portion of the tractor body which actually contacts the equalizer apparatus constitutes the crankcase 19 and is so shaped as to make such contact on a radius whereby a pivotal movement of the body or main frame on the equalizer apparatus will be permitted. A pair of studs or ridges 21 extending transversely across the top surface of the equalizer apparatus are adapted to fit into grooves 23 formed in the lower wall of the crankcase to prevent the lateral shifting of the body 9 upon the equalizer apparatus 11.

The improved equalizer apparatus also illustrated in enlarged manner in Fig. 3, but independently of the tractor construction, comprises a main equalizer mechanism including a substantially rigid inflexible mid-section 25 having affixed at each extremity a flexible member 27 extending outwardly in a substantially horizontal position therefrom. The mid-section 25, while it may be formed of a solid bar of material is preferably fabricated from a channel section, or in the form of any suitable saddle because such construction lends itself very nicely toward realizing the objects of my invention. A channel section or a saddle constitutes an extremely rigid inflexible member which may be readily formed by rolling, forging or pressing, and provides a convenient construction for mounting and affixing the spring or resilient end members 27 which in practice are preferably of the cantilever type. These may be rigidly affixed to the channel section or saddle 25 by inserting the end of the cantilever to be anchored, within one end of the saddle between the vertical side walls 29 thereof and anchoring it to the upper wall 31 by means of U-bolts or clips 33, which are bolted to the upper wall 31 of the saddle by extending the free ends of the clips through suitable openings in the wall 31 and applying the customary lock washers and nuts to the protruding ends, which are threaded for the purpose. The anchorage may be made more rugged by a suitable reinforcing plate 35 for each spring, which plate is positioned on the top wall and clamped in position by the above referred to nuts on the spring clips 33. Additional anchorage rigidity is obtained by employing a straight bolt 37 through the extremity of the fixed or anchored end of each cantilever spring to clamp this end against the upper wall 31 of the saddle, this bolt in cooperation with the clips 33 also serving to preclude displacement or fanning of the spring leaves with respect to each other.

The above referred to ridges or studs 21 extending transversely across the upper surface of the main equalizer mechanism may be independently formed with a pair of integral depending extensions 39 adapted to fit into openings formed in the upper wall 31 of the main equalizer mechanism and may be secured to the upper wall 31 as by welding. To the under surface of the wall 31 and directly under the ridges 21, a pad 40 of metal may be affixed preferably also by welding, this pad serving to reinforce the saddle at the point which takes the load of the tractor body. The pad 40 is furthermore shaped to provide a pivotal support on its under surface for the auxiliary equalizer spring 43 as will be hereinafter described.

By reason of the design and construction of the main equalizer mechanism, it will be appreciated that the mechanism may be constructed to any desired length and yet permit of a desired degree of stiffness without unduly increasing the cost thereof, which is materially less to begin with than an equivalent leaf spring because of the low cost of steel employed in the mid-section 25 as compared to the cost of spring steel. The stiffness or resiliency will depend upon the relative length of the rigid inflexible mid-section of the mechanism and the resilient end portions, and since these relative lengths may be altered in designing the apparatus, practically any degree of stiffness or resiliency may be obtained.

The auxiliary equalizer mechanism 41 which functions to hold the main frame or body of the tractor in free pivotal contacting relationship with the main equalizer mechanism in spite of the development of forces tending to cause the body 9 to jump the studs or ridges 21, and which also serves the important function of stabilizing the operation of the tractor, comprises a resilient member in the form of a semi-elliptical leaf spring 43 which is held in free pivotal contact with the under surface of the pad 40 by means of links 45 at each end of the spring 43, pivotally connecting said ends to the body of the tractor. The aforementioned pad 40 is provided with grooves 44 for the reception of the horizontal sections of U-bolts or clips 47 which clips serve to clamp and hold the auxiliary equalizer spring leaves in assembled position. This interfitting of the clips 47 in the grooves 44 formed in the pad 40 prevents side slipping of the auxiliary spring 43 with respect to the main equalizer mechanism. It is noted that the auxiliary equalizer spring 43 has been positioned within the mid-section 25 of the main equalizer mechanism between the vertical side walls 29 thereof and this is important in that such cooperation avoids the necessity of occupying space below the main equalizer mechanism as in the Best patent previously cited, in which position it limits the clearance to ground.

The link members 45 are located one at each side of an end of the spring 43 and pivotally affixed thereto by means of a pin 49 passing through adjacent ends of the link elements and the end of the spring, and held in assembly by a cotter pin through the protruding end of the pin. The links pass through suitable guide openings 51 formed in the upper wall 31 of the rigid mid-section of the main equalizer mechanism and the reinforcing plate 35, and the upper ends of the links are adapted to be pivotally connected at the ends of the horizontal portion 53 of an inverted T-bolt 55 by means of a similar pin 57 passing through the horizontal portion of the bolt and the upper ends of the links. The vertical end of the bolt is threaded and is adapted to be bolted to the body of the tractor to thereby effect connection between the body and the auxiliary equalizer mechanism. In assembling the equalizer apparatus on the tractor, the auxiliary equalizer spring 43 is loaded so that in the normal position of a tractor, that is, with both tracks on smooth ground, there will exist a tension stress in each link 45 to effect a positive force holding the body 9 to the main equalizer mechanism.

It will appear from the above detailed description of my invention, that I have accomplished or fulfilled the objects of my invention. The main equalizer mechanism which includes the rigid inflexible mid-section in the form of a channel section or saddle and the cantilever springs anchored to the ends thereof, is adapted for use with tractors of wide gauge in that it provides means for obtaining a desired condition of stiffness without unnecessarily increasing its cost. And by reason of its composite construction, repairs can readily be effected, or if it should be found desirable to alter the length of the equalizer construction, either the spring elements or the mid-section may be interchanged for others of different sizes or lengths.

The mid-section being formed of channel or fabricated into the form of a saddle and having the cantilever springs extending outwardly therefrom, permits of positioning the auxiliary equalizer mechanism within the channel or saddle between the vertical side walls thereof to provide equalizer apparatus including both a main and an auxiliary equalizer mechanism which will permit of maximum clearance to ground. The entire construction possesses all of the above stated advantages without sacrificing any of the desirable features attributed to the construction described in the Best patent referred to above.

While I have discussed my invention in detail, it will be apparent that it is susceptible to variations within the contemplated scope of my invention, and I accordingly do not desire to be limited in my protection to these specific details of the embodiment of my invention as described above except as may be necessitated by the prior art and the appended claims.

I, therefore, claim as my invention:

1. A vehicle including a body and a pair of spaced surface engaging means hingedly secured to said body to permit vertical movement of said surface engaging means independently of each other, a main equalizer mechanism for providing a support for said body comprising means bridging said surface engaging means and having a substantially rigid inflexible mid-section and flexible end portions, and an auxiliary equalizer mechanism for maintaining said body in engagement with said main equalizer mechanism, said auxiliary equalizer mechanism being located underneath said mid-section and between said flexible end portions whereby impairment of ground clearance is minimized.

2. A vehicle including a body and a pair of spaced surface engaging means hingedly secured to said body to permit vertical movement of said surface engaging means independently of each other, a main equalizer mechanism for providing a support for said body comprising means bridging said surface engaging means and having a recess therein, and auxiliary equalizer mechanism positioned within said recess whereby impairment of ground clearance is minimized.

3. A track-type tractor including a body and a pair of spaced track mechanisms hingedly secured to said body to permit vertical movement of said track mechanisms independently of each other, a main equalizer mechanism for providing support for said body comprising means bridging said track mechanisms and having a substantially rigid mid-section and substantially horizontally disposed flexible end portions, and an auxiliary equalizer mechanism positioned underneath said mid-section and between said flexible end portions whereby impairment of ground clearance is minimized.

4. A tractor including a body, spaced frames for supporting ground engaging means hingedly secured to said body to allow oscillatory movement thereof relative to said body independently of each other, a main equalizer mechanism providing support for said body on said spaced frames comprising a substantially rigid inflexible and substantially straight horizontally disposed mid-section upon which said body rests and a leaf spring secured to each end of said mid-section and resting on an adjacent frame, such springs providing a space therebetween which would otherwise be closed if the main equalizer mechanism were made of a single leaf spring, and auxiliary equalizer mechanism positioned in said space whereby impairment of ground clearance is minimized.

HARMON S. EBERHARD.